Aug. 25, 1925.
A. V. FEILD
1,551,476
HARVESTER REEL
Filed July 18, 1924     2 Sheets-Sheet 1
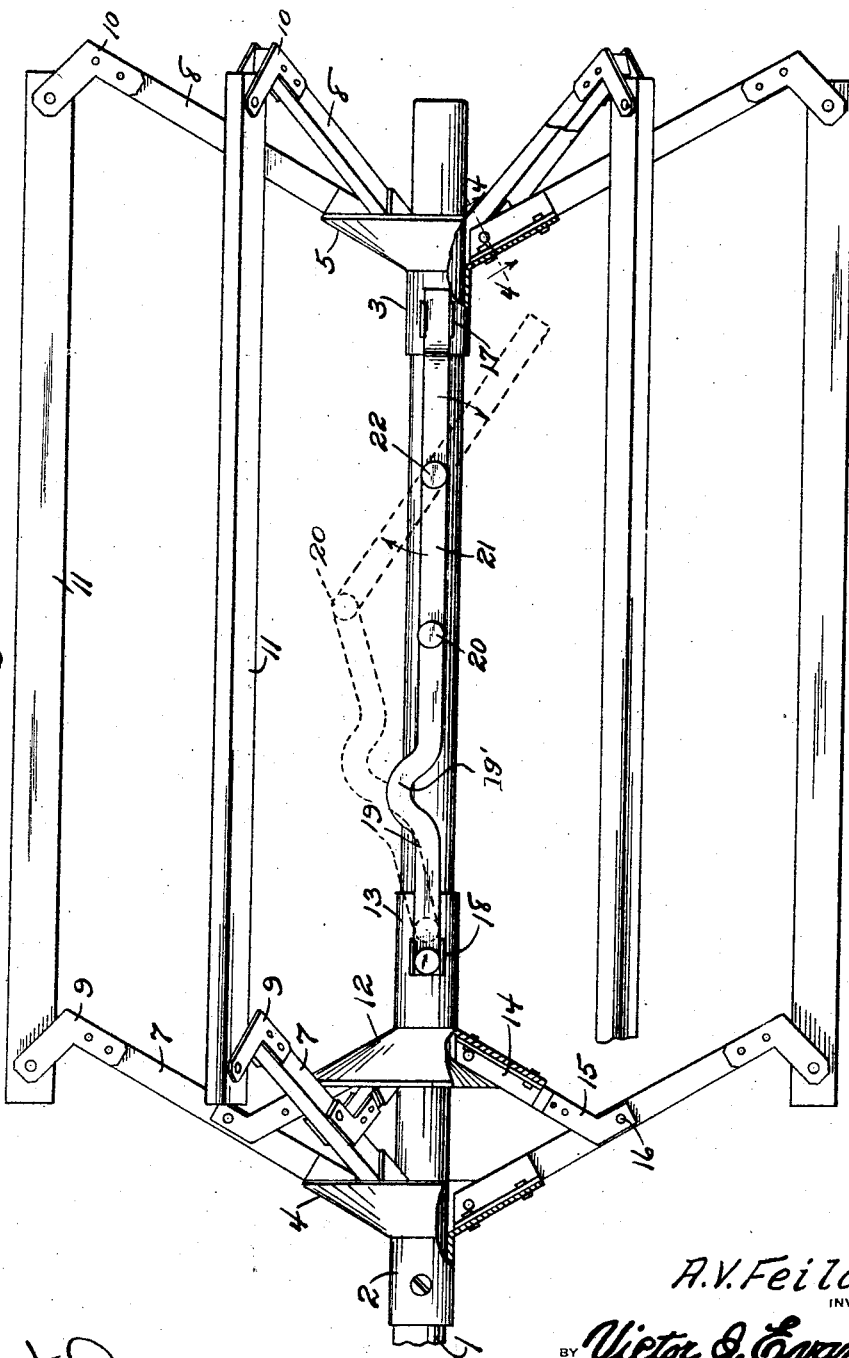

Aug. 25, 1925.
A. V. FEILD
HARVESTER REEL
Filed July 18, 1924
1,551,476
2 Sheets-Sheet 2
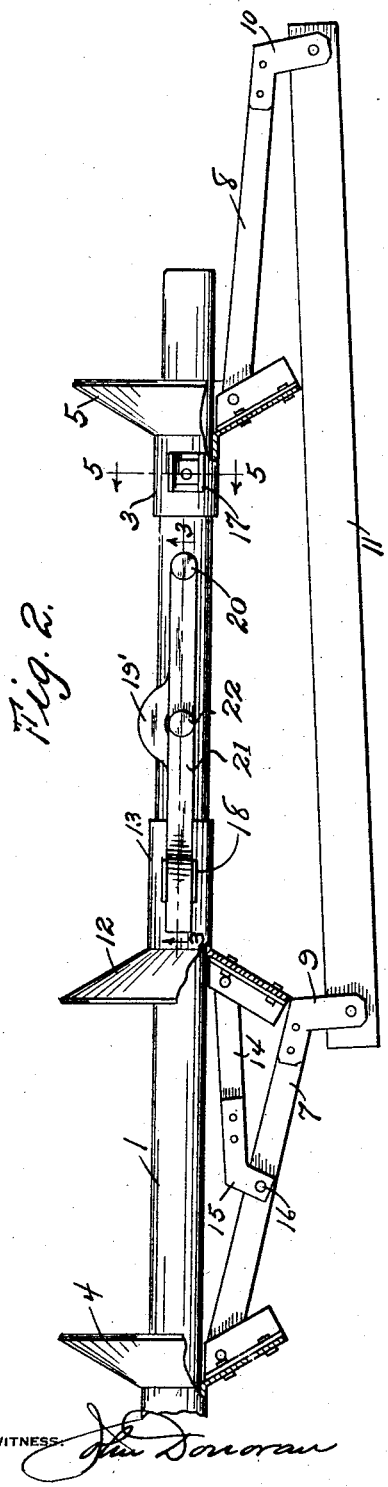
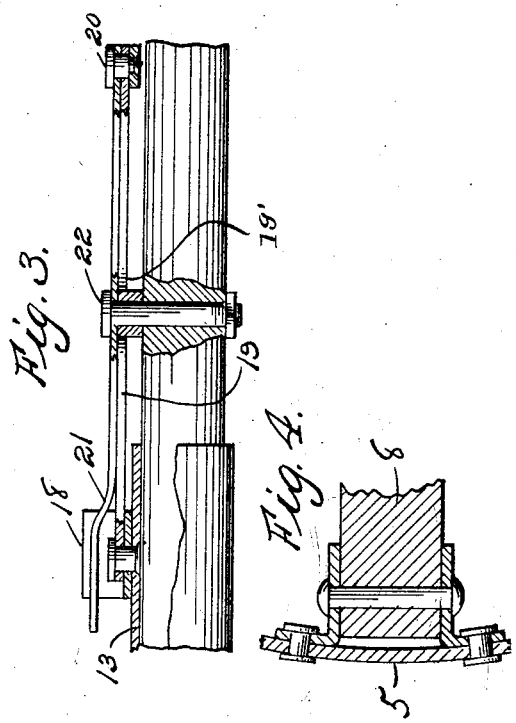
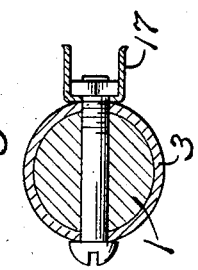
A. V. Feild
INVENTOR
BY Victor J. Evans
ATTORNEY Patented Aug. 25, 1925.

1,551,476

UNITED STATES PATENT OFFICE.

ALBERT V. FEILD, OF LAKE VICTOR, TEXAS.

HARVESTER REEL.

Application filed July 18, 1924. Serial No. 726,845.

*To all whom it may concern:*

Be it known that I, ALBERT V. FEILD, a citizen of the United States, residing at Lake Victor, in the county of Burnet, and State of Texas, have invented new and useful Improvements in Harvester Reels, of which the following is a specification.

My present invention has reference to a collapsible reel for harvesters.

My object is to construct a reel of this character whereby the slats may be easily moved and locked in outer operative position, and likewise easily folded against the reel shaft and held locked in such position, when the harvester is traveling through a narrow road, gateway or the like.

To the attainment of the foregoing broadly stated objects and others which will appear as the nature of the invention is better understood, reference is to be had to the drawings which accompany and which form part of this application.

In the drawings:—

Figure 1 is a side elevation of a harvester reel in accordance with this invention.

Figure 2 is a fragmentary side elevation with the slats collapsed or folded, parts being in section.

Figure 3 is a sectional view on the line 3—3 of Figure 2.

Figure 4 is a sectional view on the line 4—4 of Figure 1.

Figure 5 is a sectional view on the line 5—5 of Figure 2.

The shaft for the reel is indicated by the numeral 1. Fixed on the shaft 1, adjacent to the ends thereof, are stationary sleeves 2 and 3 respectively. Both of the sleeves are provided at their outer ends with frusto-conical or funnel-shaped enlargements 4 and 5 respectively. In their concaved faces the funnel-shaped members 4 and 5 are provided with ears arranged in spaced pairs and between each pair of ears there are pivoted links 7 and 8 respectively. The links have on their outer ends angularly disposed plates 9 and 10 and between each pair of plates there is pivoted a slat 11.

Mounted for slidable movement on the reel shaft 1, at a suitable distance from the frusto-conical or funnel-shaped member 4 there is a similarly shaped member 12. This member is formed with a sleeve 13 surrounding and slidable on the shaft. The member 13 has its hollow face disposed opposite the hollow face of the member 4 and has arranged therein spaced ears arranged in pairs and between which there are pivoted links 14. Each of the links has on its sides at its outer end angle plates 15 which are pivoted, as at 16, to the links 7.

On the sleeves 3 and 13 there are aligning U-shaped keepers 17 and 18. Pivotally secured to the sleeve 13, beneath and by the same element that holds the keeper 18 on said sleeve 13, there is an arm 19. Pivotally secured to the outer end of the arm, as at 20, there is a lever 21. The lever is approximately centrally pivoted, as at 22, to the shaft 1. The lever, and the element 19 connected thereto, provide breakable members.

Assuming the reel to be in folded position, as disclosed in Figure 2 of the drawings, it will be seen that the lever 21 has been swung so that its free end is received in the keeper 18 on the sleeve 13. When it is desired to open or expand the reel, the lever 21 is brought out of the keeper 18 and is swung in a counterclockwise direction on its pivot 22. This swinging of the lever exerts a pressure on the arm 19, causing the same to influence the sleeve 13 toward the sleeve 2. The links 14, carried by the element 12, will exert an influence on the links 7 to swing the latter outwardly with respect to the shaft, and such movement of the links will draw on the slats 11 which will exert a pull on the links 8 carried by the element 5 to swing the same to an outward angle with respect to the shaft. When the turning of the lever 21 is completed, that is, when the said lever is in longitudinal alignment with the arm 19 and the slats 11 are fully expanded, the free end of the said lever 21 will be in a position to be received in the keeper 17. In this manner it will be noted that the reel is effectively locked in either its contracted or expanded positions. The arm 19 is provided with an offset or bent portion 19' that receives therein the pivot 22 for the lever 21 when the lever is swung over the said arm to the position illustrated in Figure 2 of the drawings.

It is believed that the foregoing description, when taken in connection with the drawings, will fully set forth the construction, operation and advantages of the improvement to those skilled in the art to which such inventions relate, it being noted that the links 7, 8 and 15 are limited in their swinging movement by contacting engagement with the frusto-conical or funnel-shaped members 4, 5 and 12 respectively. Also it will be noted that the lever 21 can be readily swung to bring the slats 11 to operative or inoperative position.

Having described the invention, I claim:—

1. A reel for the purpose set forth, including a shaft, links pivotally secured to the shaft adjacent to the inner and outer ends thereof, slats pivotally connected with the links, a slidable sleeve on the shaft, links pivotally associated therewith and pivotally connected with the inner first mentioned links, a member pivotally connected to the sleeve, a lever pivotally connected to the member and to the shaft, and keepers for the lever to engage therewith when the same is swung longitudinally with respect to the pivoted member and at an inward angle with respect thereto, for the purpose set forth.

2. A reel for the purpose set forth including a shaft, outwardly directed funnel-shaped members fixed respectively adjacent to the inner and to the outer end of the shaft, links pivotally secured in the concaved faces of the said funnel-shaped members, slats pivotally secured to said links, a slidable funnel-shaped member on the shaft, disposed adjacent to the inner fixed funnel-shaped member, and having its concaved face facing that of the inner fixed funnel-shaped member, links on the slidable funnel-shaped member pivotally secured to the links of the inner fixed funnel-shaped member, an arm pivoted on the slidable funnel-shaped member, a lever pivoted on the shaft and likewise pivoted to the outer end of the arm, and keeper members on the slidable and on the outer fixed funnel-shaped member to receive the lever therein when the latter is swung over the arm to collapse the reel or swung into longitudinal alignment therewith to expand the reel.

In testimony whereof I affix my signature.

ALBERT V. FEILD.